G. ESCHELLMANN & A. HARMUTH.
GAS COOLER.
APPLICATION FILED AUG. 29, 1911.
1,078,841.
Patented Nov. 18, 1913.
2 SHEETS—SHEET 1.
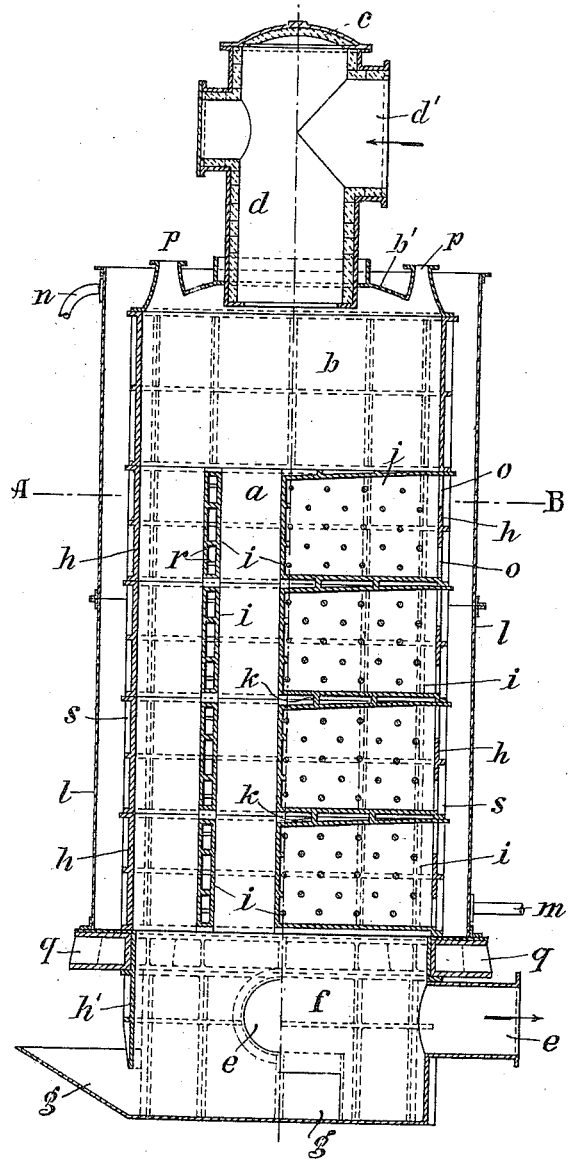
WITNESSES
INVENTORS
GEORG ESCHELLMANN
ALBERT HARMUTH
BY
ATTORNEYS

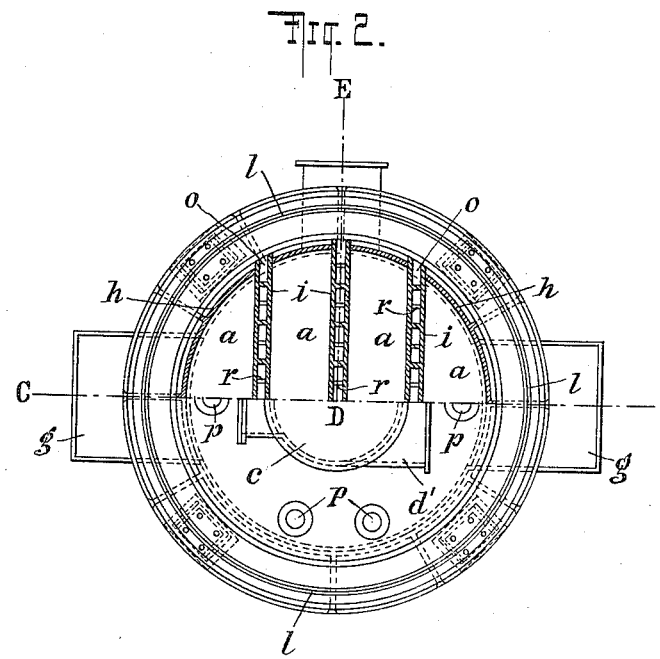

UNITED STATES PATENT OFFICE.

GEORG ESCHELLMANN AND ALBERT HARMUTH, OF ST. PETERSBURG, RUSSIA, ASSIGNORS TO GENERAL CHEMICAL COMPANY, OF NEW YORK, N. Y., A CORPORATION OF NEW YORK.

GAS-COOLER.

1,078,841.

Specification of Letters Patent. Patented Nov. 18, 1913.

Application filed August 29, 1911. Serial No. 646,613.

*To all whom it may concern:*

Be it known that we, GEORG ESCHELLMANN and ALBERT HARMUTH, British subject and German subject, respectively, and residents of St. Petersburg, Russia, have invented a new and useful Improvement in Gas-Coolers, of which the following is a specification.

The present invention relates to the cooling of hot gases from roasting or calcining furnaces and in particular to the cooling of gases produced by the roasting of iron pyrites or other sulfur bearing ores and intended to be used in the manufacture of sulfuric anhydrid by the contact process.

As is known, it is a very difficult practical problem to cool such gases quickly and completely while preserving the material of the apparatus, since roasting or calcination gases contain acid gases and liquids in the form of mist which condense and attack such material.

Attempts have been made to effect the cooling by means of towers (after the style of the Glover tower used for denitrating in the chamber process), the sulfuric acid which is caused to trickle or descend through the tower being cooled after leaving the tower and being pumped back into the same. Apart from the complication and expense occasioned by the pumping, the acid becomes laden with dust which is carried in considerable quantities by the gases, so that the acid cannot be used over again continuously without the interposition of suitable settling devices. For this reason the employment of sulfuric acid towers for cooling pyrites burner gases for use in the contact process has in some cases not proven satisfactory.

Indirect cooling of the hot pyrites burner gases, (which are usually at a temperature of about 500° C.), by means of tubular coolers, is subject to the disadvantage that the lead cooling tubes are in part rapidly destroyed by the deposition of heated sulfuric acid upon them together with the separation of dust which is thereby facilitated and which forms a more or less difficultly removable crust on the tubes. Moreover tubular coolers are not always easy of access for repairs.

According to the present invention the hot gases from pyrites kilns can be cooled according to the indirect method, and without any of the above additional devices or steps, by employing, instead of tubular coolers, plate coolers composed of series of upright hollow cooling plates through which the cooling agent flows, as shown in one constructional example in the acompanying drawings.

Figure 1 is a vertical section of our apparatus, the left half of such figure being a vertical section on line C—D of Fig. 2, and the right half a vertical section on line D—E of Fig. 2.

The upper half of Fig. 2 is a horizontal section on line A—B of Fig. 1, while the lower half is a half plan view of the apparatus.

The apparatus consists of a cylindrical cooling chamber $a$; a preliminary or distributing chamber $b$, having a cover $b^1$, a crown or pipe $d$ provided with a cover $c$ and a side opening $d^1$ through which the burner gases are admitted from above into the chamber $b$; and a collecting chamber $f$ provided with an outlet $e$ for the cooled gases, this collecting chamber being open at the bottom and dipping into a trough $g$ filled with acid which trough serves to catch acid that condenses and thus forms a hydraulic seal for the cooler.

The cooling chamber is built up of a number of superposed annular sections $h$ suitably joined together at their flanges, and each containing several series (three by way of example in the drawing) of upright hollow plates $i$ correspondingly arranged. These plates do not occupy the full height of the annular segment to which they appertain, and they are supported by stays $k$.

The cooling chamber $a$ and distributing chamber $b$ are inclosed by a casing $l$ which is connected at bottom to a supply pipe $m$ for cooling water and at top to an outlet pipe $n$ for the same. This casing communicates with the cooling plates $i$ at their top and bottom parts by series of slots $o$. The top wall of the cooling plates is upwardly inclined from the interior toward the exterior of the apparatus. The distributing chamber $b$ and the collecting chamber $f$ are likewise built up of annular segments $h$, and a number of pipe unions $p$, normally closed, are provided around the circumference of the cover $b^1$ of the distributing chamber $b$, to enable flushing water to be run in.

With the exception of the casing $l$, which should be of wrought iron, the apparatus is constructed of lead, preferably pure cast lead, and it is carried on a cast iron ring $q$, which may be supported in any suitable manner. The cooling plates are stiffened by numerous cross stays $r$, and the annular segments $h$ by ribs $s$.

The pyrites burner gases to be cooled are led through the opening $d^1$ into the pipe $d$, fill the chamber $b$ and are distributed therefrom into the spaces between the cooling plates $i$, along which they descend to the collecting chamber $f$ and thence pass off through the outlet $e$. The cooling water is led through the pipe $m$ into the bottom of the casing $l$, in which it rises, at the same time flowing through the cooling plates, and it flows off at top through the pipe $n$. Air bubbles which may form in the water in the cooling plates are led off by the upward inclination of the top walls of the same toward the circumference. The sulfuric acid which condenses on the cooling plates falls into the trough $g$ from which the surplus acid runs off freely. For rinsing or flushing the cooler, water is admitted through the pipe unions $p$ on the cover and runs off through $q$ laden with the sludge washed off the cooling plates.

By means of the plate cooler described, the hot gases from pyrites kilns which have a temperature of about 500° C. can be cooled down to ordinary temperature in one passage through the apparatus. By reason of this rapid and intense cooling, a very good separation of the sulfuric acid present in the gases in the form of mist is attained. Sludge does not bake on to the cooling plates, but can be easily rinsed off them.

It has been found that it is sufficient to flush the apparatus at intervals of from 4 to 6 weeks. There is no risk that the apparatus will become choked. On taking off the cover $c$, the cooler is readily accessible through the pipe or crown $d$ for any kind of repairs.

Notwithstanding its simplicity of construction and the small space occupied, the apparatus provides a large cooling surface. It is very durable and is simple and cheap to operate.

We do not limit ourselves to the exact construction shown in the drawings, but desire it to be understood that many modifications of construction and arrangement can be made without departing from the spirit of our invention as defined in the appended claims.

Having now particularly described the nature of our said invention, we declare that what we claim is:—

1. A cooling apparatus comprising superposed sections, each section comprising an outer casing and hollow partitions walls within said casing and dividing the latter into a plurality of separated compartments, the compartments of each section being in communication with the corresponding compartments of adjoining sections and the hollow portions of said partition walls being in communication with the exterior of the casing.

2. A cooling apparatus comprising a gas conducting tower having partitions each partition being composed of lead and comprising walls and cross stays extending between said walls to hold them in separated relation, the space between said walls being in communication with the exterior of the tower.

3. A cooling apparatus comprising a vessel, a cooling jacket therefor and a hollow plate within said vessel, the hollow portion of said plate being in communication with said jacket and the upper wall of said hollow portion being inclined upwardly outward.

4. A cooling apparatus comprising a gas-conducting tower having partitions comprising a series of hollow cooling blocks and a cooling jacket surrounding said tower and being in communication with the hollows of said partition blocks.

In testimony whereof, we have hereunto set our hands in the presence of two subscribing witnesses.

GEORG ESCHELLMANN.
ALBERT HARMUTH.

Witnesses:
L. HOLTZHAUER,
AUG. MIGHIS.